(12) United States Patent
Park et al.

(10) Patent No.: US 10,435,597 B2
(45) Date of Patent: Oct. 8, 2019

(54) SEAL TAPE (71) Applicant: LG Chem, Ltd., Seoul (KR)

(72) Inventors: Min Soo Park, Daejeon (KR); Yoon Tae Hwang, Daejeon (KR); Se Woo Yang, Daejeon (KR); Myung Seob Kim, Daejeon (KR); Mun Sung Kim, Daejeon (KR)

(73) Assignee: LG Chem, Ltd. (KR)

( * ) Notice: Subject to any disclaimer, the term of this patent is extended or adjusted under 35 U.S.C. 154(b) by 358 days.

(21) Appl. No.: 14/911,192

(22) PCT Filed: Aug. 14, 2014

(86) PCT No.: PCT/KR2014/007596
§ 371 (c)(1),
(2) Date: Feb. 9, 2016

(87) PCT Pub. No.: WO2015/023152
PCT Pub. Date: Feb. 19, 2015

(65) Prior Publication Data
US 2016/0177136 A1 Jun. 23, 2016

(30) Foreign Application Priority Data

Aug. 16, 2013 (KR) .................. 10-2013-0097404
Jun. 13, 2014 (KR) .................. 10-2014-0071993
(Continued)

(51) Int. Cl.
*H01M 2/02* (2006.01)
*H01M 10/04* (2006.01)
(Continued)

(52) U.S. Cl.
CPC ............... *C09J 133/08* (2013.01); *C09J 7/22* (2018.01); *C09J 7/255* (2018.01); *C09J 7/30* (2018.01);
(Continued)

(58) Field of Classification Search
CPC .............................. C09J 7/0239; H01M 2/022
See application file for complete search history.

(56) References Cited

U.S. PATENT DOCUMENTS 6,162,529 A * 12/2000 Uchida ................. B29C 55/026
242/160.1
2004/0202796 A1  10/2004 Ander et al.
(Continued)

FOREIGN PATENT DOCUMENTS

CN  101910346 A  12/2010
CN  103003379 A  3/2013
(Continued)

OTHER PUBLICATIONS

Translation of KR20070096649.*
(Continued)

*Primary Examiner* — Ula C Ruddock
*Assistant Examiner* — Gregory A Passa
(74) *Attorney, Agent, or Firm* — Lerner, David Littenberg, Krumholz & Mentlik, LLP (57) ABSTRACT Provided are a seal tape and a secondary battery. The seal tape for adhering an electrode assembly includes a pressure-sensitive adhesive layer including a cured product of a pressure-sensitive adhesive composition including a polymer including a polar functional group-containing monomer as a polymerization unit, and is expanded in contact with an electrolyte solution to be detached from the electrode assembly, and therefore, isotropic volume expansion and contraction of the electrode assembly may be induced by repeated
(Continued)

charge and discharge of a secondary battery and a disconnection phenomenon in which an electrode is disconnected may be prevented.

19 Claims, 3 Drawing Sheets

(30) Foreign Application Priority Data

Aug. 14, 2014 (KR) .................. 10-2014-0106142
Aug. 14, 2014 (KR) .................. 10-2014-0106147

(51) Int. Cl.

| | |
|---|---|
| C09J 133/08 | (2006.01) |
| H01M 2/08 | (2006.01) |
| C09J 7/38 | (2018.01) |
| C09J 7/22 | (2018.01) |
| C09J 7/30 | (2018.01) |
| C09J 7/25 | (2018.01) |
| C09J 133/14 | (2006.01) |
| C08K 5/29 | (2006.01) |

(52) U.S. Cl.
CPC .............. *C09J 7/38* (2018.01); *C09J 7/385* (2018.01); *H01M 2/022* (2013.01); *H01M 2/08* (2013.01); *H01M 10/0422* (2013.01); C08K 5/29 (2013.01); C09J 133/14 (2013.01); C09J 2201/122 (2013.01); C09J 2201/606 (2013.01); C09J 2201/622 (2013.01); C09J 2203/33 (2013.01); C09J 2205/114 (2013.01); C09J 2401/006 (2013.01); C09J 2423/006 (2013.01); C09J 2433/00 (2013.01); C09J 2433/006 (2013.01); C09J 2467/006 (2013.01); C09J 2469/006 (2013.01); C09J 2475/006 (2013.01); C09J 2477/006 (2013.01); H01M 2220/30 (2013.01)

(56) References Cited

U.S. PATENT DOCUMENTS

| | | |
|---|---|---|
| 2009/0098416 A1 | 4/2009 | Hatta et al. |
| 2011/0064995 A1 | 3/2011 | Kim |
| 2011/0187970 A1 | 8/2011 | Kim et al. |
| 2011/0245364 A1 | 10/2011 | Song et al. |
| 2011/0300361 A1 | 12/2011 | Nakayama et al. |
| 2012/0196171 A1 | 8/2012 | Ikishima et al. |
| 2012/0328800 A1 | 12/2012 | Yoon et al. |
| 2013/0071740 A1 | 3/2013 | Takamura et al. |
| 2013/0157086 A1 | 6/2013 | Kawabe et al. |
| 2014/0016069 A1 | 1/2014 | Kim et al. |
| 2014/0030519 A1* | 1/2014 | Morimoto ............ C09J 7/0217 428/356 |
| 2014/0106207 A1 | 4/2014 | Kim et al. |

FOREIGN PATENT DOCUMENTS

| | | | |
|---|---|---|---|
| EP | 1323802 | A2 | 7/2003 |
| EP | 2477252 | A1 | 7/2012 |
| EP | 2492992 | A1 | 8/2012 |
| EP | 2658025 | A2 | 10/2013 |
| EP | 2677015 | A2 | 12/2013 |
| EP | 2683002 | A2 | 1/2014 |
| JP | 2003151634 | A | 5/2003 |
| JP | 2009079203 | A | 4/2009 |
| JP | 2012064714 | A | 3/2012 |
| JP | 2013004595 | A | 1/2013 |
| JP | 2013142124 | A | 7/2013 |
| KR | 20070096649 | A * | 10/2007 |
| KR | 20080092872 | A | 10/2008 |
| KR | 20100075723 | A | 7/2010 |
| KR | 20110028200 | A | 3/2011 |
| KR | 20120087106 | A | 8/2012 |
| KR | 20120106925 | A | 9/2012 |
| KR | 20120110032 | A | 10/2012 |
| KR | 20120113684 | A | 10/2012 |
| KR | 20120119955 | A | 11/2012 |
| TW | 201207068 | A | 2/2012 |
| TW | 201302966 | A | 1/2013 |
| TW | 201309769 | A | 3/2013 |
| WO | 2012138153 | A2 | 10/2012 |
| WO | WO 2011105878 | A9 * | 1/2013 ................ C09J 7/00 |

OTHER PUBLICATIONS

Liquid Optics, http://www.humiseal.com/products/liquid-optically-clear-adhesives/70501/, provided as evidentary for response to arguments.*
Search Report from European Application No. 14835892.2, dated Feb. 15, 2017.
Search Report for Application No. TW103128108 dated Sep. 14, 2015.
International Search Report for Application No. PCT/KR2014/007596 dated Nov. 19, 2014.
Search Report for Application No. TW103128107 dated Aug. 4, 2015.
International Search Report for Application No. PCT/KR2014/007597 dated Nov. 20, 2014.
Extended European Search Report for Application No. EP14836234 dated May 16, 2017.

* cited by examiner

SEAL TAPE

CROSS-REFERENCE TO RELATED APPLICATION

The application is a national phase entry under 35 U.S.C. § 371 of International Application No. PCT/KR2014/007596, filed Aug. 14, 2014, which claims priority to Korean Application No. 10-2013-0097404, filed Aug. 16, 2013, and Korean Application No. 10-2014-0071993, filed Jun. 13, 2014, and Korean Application No. 10-2014-0106142, filed Aug. 14, 2014, and Korean Application No. 10-2014-0106147, filed on Aug. 14, 2014 the disclosures of which are incorporated herein by reference.

TECHNICAL FIELD

The present application relates to a seal tape and a secondary battery.

BACKGROUND ART

According to development of technology and an increase in demand for mobile devices, demand for secondary batteries as an energy source has drastically increased, and particularly, among the secondary batteries, a lithium secondary battery having high energy density and discharge voltage is being commercialized and widely used. The secondary batteries are classified into a cylindrical battery and a prismatic battery in which an electrode assembly is embedded in a cylindrical or prismatic metal can, and a pouch-type battery in which an electrode assembly is installed in a pouch-type case of an aluminum-laminated sheet.

For example, the cylindrical battery is manufactured by fixing an end of a jelly roll-type electrode assembly (hereinafter, "jelly roll") with a seal tape including a pressure-sensitive adhesive layer, and accommodating the electrode assembly in a cylindrical metal case, and due to the characteristics of the secondary battery, during repeated charge/discharge, anisotropic volume expansion and contraction are repeated using the seal tape. In this case, an outer surface of the jelly roll is under the largest influence of the anisotropic expansion and contraction, and thereby a disconnection phenomenon in which an electrode is disconnected may occur.

DISCLOSURE

Technical Problem

The present application is directed to providing a seal tape and a secondary battery.

Technical Solution

In one aspect, the present application provides a seal tape. In one example, in the case of a secondary battery manufactured by adhering the seal tape to an electrode assembly by means of a pressure-sensitive adhesive layer and inserting the electrode assembly into a battery can, when the pressure-sensitive adhesive layer is in contact with an electrolyte solution, the pressure-sensitive adhesive layer absorbs the electrolyte solution, and the pressure-sensitive adhesive layer is then expanded or swelled. Here, the seal tape is formed in a three-dimensional stereoscopic structure, and a surface of the pressure-sensitive adhesive layer has a surface roughness value in a specific range. Accordingly, since an adhesive strength or a peeling strength between the electrode assembly and the pressure-sensitive adhesive layer is reduced, the pressure-sensitive adhesive layer is released from the electrode assembly, and therefore, a disconnection phenomenon of an electrode may be prevented by inducing isotropic volume expansion and contraction of the electrode assembly.

Hereinafter, the seal tape of the present application will be described with reference to the accompanying drawings, but the drawings are exemplary, and the seal tape of the present application is not limited to the accompanying drawings.

Figure 1:
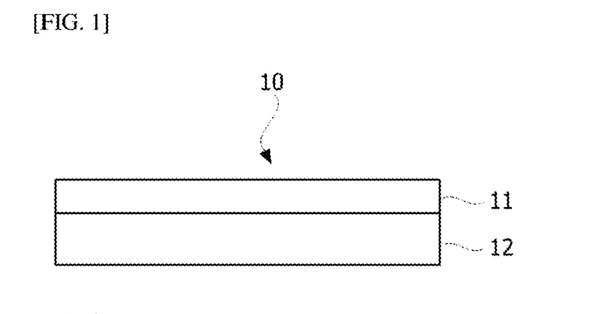
FIG. 1 is a schematic cross-sectional view of an exemplary seal tape of the present application.

FIG. 1 is an exemplary cross-sectional view of a seal tape 10.

Referring to FIG. 1, the seal tape 10 includes a base layer 12 and a pressure-sensitive adhesive layer 11 formed on one surface of the base layer 12.

The base layer 12 may be, for example, at least one selected from the group consisting of an acryl film, a polyolefin film, a polyamide film, a polycarbonate film, a polyurethane film, a cellulose acetate film, and a polyester film, but the present application is not limited thereto.

When a polyester film is used as the base layer 12, at least one selected from the group consisting of a polyethyleneterephthalate film, a polyethylenenaphthalate film, and a polybutyleneterephthalate film may be used, and when a cellulose-based base layer is used as the base layer 12, for example, as the base layer 12 including a cellulose acetate resin or a cellulose alkylate resin, the base layer 12 formed by applying a mixture including the resin to an extrusion or casting process may be used. Here, as the cellulose alkylate, for example, cellulose acetate propionate or cellulose acetate butylate may be used.

A method of forming a base layer 12 using the resin may be, but is not particularly limited to, for example, a method of forming a conventional film or sheet, such as extrusion or casting, using a raw material including the resin and a known additive as needed.

When the base layer 12 is formed in a sheet or film, the base layer 12 may have a thickness of, for example, approximately 10 to 200 µm, 10 to 100 µm, 10 to 50 µm, 15 to 30 µm, or 15 to 20 µm.

The seal tape 10 includes the pressure-sensitive adhesive layer 11, and the pressure-sensitive adhesive layer 11 may absorb an electrolyte solution, and may be expanded after a contact with the electrolyte solution, and therefore, the seal tape 10 may form a three-dimensional stereoscopic structure. For example, the pressure-sensitive adhesive layer 11 may be expanded in a thickness direction and/or a length direction of the pressure-sensitive adhesive layer 11 when in contact with the electrolyte solution, and therefore may have a stereoscopic structure. Here, the term "stereoscopic structure" of the seal tape 10 is formed by an action of an expansion strength of the pressure-sensitive adhesive layer 11 and a peeling strength of the base layer 12 of the seal tape 10 in contact with the electrolyte, and may include all structures in which the pressure-sensitive adhesive layer 11 can be detached from an electrode assembly.

In one example, the stereoscopic structure may include a plurality of shapes protruding in a direction perpendicular to the length direction of the pressure-sensitive adhesive layer. Here, the term "length direction" may refer to a direction perpendicular to the thickness direction of the pressure-sensitive adhesive layer when the pressure-sensitive adhesive layer is maintained in a planar shape. In addition, the term "perpendicular" or "parallel" may refer to substantially perpendicular or parallel without damage to a desired effect, and may include an error of approximately ±10, ±5, or ±3 degrees.

A center line average roughness (Ra) of a surface of the pressure-sensitive adhesive layer having a stereoscopic structure including a plurality of protruding shapes after a contact with the electrolyte solution as described above may be 100 to 250 μm, for example, 150 to 240 μm or 155 to 230 μm. The center line average roughness (Ra) may be a value measured after 24 hours from the time when the electrolyte solution is contacted. When the center line average roughness of the stereoscopic structure of the pressure-sensitive adhesive layer of the present application is controlled to be within the above-described range, the seal tape may be effectively detached from a circumferential surface of the electrode assembly. The term "center line average roughness" refers to a value which can be obtained from Equation 1 in units of micrometers when a cross-section of the pressure-sensitive adhesive layer having a stereoscopic structure is photographed, cross-section of a three-dimensional structure is remodeled from the photographed image in a mathematical method to obtain a roughness curve, and then data is extracted by a standard length L in a direction of an average line in the roughness curve, in which the direction of the average line is represented as an x axis, a longitudinal direction is represented as a y axis, and the roughness curve is represented by y=f(x).

$$R_a = \frac{1}{L}\int_0^L |f(x)|\,dx \qquad \text{[Equation 1]}$$

The center line average roughness may be measured under a specification of ASTM D4417, or obtained as defined by JIS B0031 or JIS B0601.

In one example, the pressure-sensitive adhesive layer 11 may include a cured product of a pressure-sensitive adhesive composition, and include a polymer included in the pressure-sensitive adhesive composition in a crosslinked form. For example, the pressure-sensitive adhesive composition includes a polymer having a polymerization unit derived from a (meth)acrylic acid ester monomer, a monomer having a polar functional group, and a crosslinkable monomer containing a crosslinkable functional group. In one example, in the case of a secondary battery manufactured by adhering the seal tape including the pressure-sensitive adhesive layer formed by the pressure-sensitive adhesive composition to the electrode assembly by means of the pressure-sensitive adhesive layer, and inserting the electrode assembly into a battery can, the pressure-sensitive adhesive layer is transformed, for example, swelled or expanded due to the presence of the polar functional group of the monomer having the polar functional group present in the pressure-sensitive adhesive layer when in contact with an electrolyte injected into the secondary battery. Here, since the seal tape forms a three-dimensional stereoscopic structure and a surface of the pressure-sensitive adhesive layer has a surface roughness value in a specific range, thereby reducing an adhesive strength or peeling strength between the electrode assembly and the pressure-sensitive adhesive layer, the pressure-sensitive adhesive layer may be detached from the electrode assembly, and thereby disconnection of the electrode by inducing isotropic volume expansion and contraction of the electrode assembly may be prevented.

The pressure-sensitive adhesive composition includes a polymer having a polymerization unit, and in one example, the polymer may include, for example, a (meth)acrylic acid ester monomer, a monomer having a polar functional group, and a crosslinkable monomer having a crosslinkable functional group in a polymerized form.

As a (meth)acrylic acid ester monomer included in the polymer as a polymerization unit, for example, an alkyl (meth)acrylate may be used, and in consideration of a cohesive strength, a glass transition temperature, or a pressure-sensitive adhesive property of the pressure-sensitive adhesive, an alkyl (meth)acrylate having an alkyl group having 1 to 14 carbon atoms may be used. Such a monomer may be, but is not limited to, one or at least two of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, and tetradecyl (meth)acrylate.

Here, the term "(meth)acrylate" refers to an acrylate or a methacrylate, which may be applied to other terms using "(meth)".

The monomer having the polar functional group is a monomer having an excellent affinity with an electrolyte, and the monomer having the polar functional group is included in the polymer of the pressure-sensitive adhesive composition in a polymerization unit to reduce an adhesive strength or peeling strength between the electrode assembly and the pressure-sensitive adhesive layer by being transformed, for example, swelled or expanded when the pressure-sensitive adhesive layer formed by the pressure-sensitive adhesive composition is in contact with the electrolyte. In addition, in the present application, a stereoscopic structure having a specific surface roughness may be formed when the seal tape is in contact with the electrolyte solution by applying a monomer having a specific structure as the monomer having the polar functional group, and therefore the seal tape may be detached from the electrode assembly with an excellent efficiency to induce isotropic volume expansion and contraction of the electrode assembly and effectively prevent disconnection of the electrode.

In one example, the monomer having the polar functional group may be represented by Formula 1:

[Formula 1]

In Formula 1, $R_1$ represents hydrogen or an alkyl group having 1 to 12 carbon atoms, $R_2$ represents an alkylene group having 1 to 6 carbon atoms, $R_3$ represents hydrogen, an alkyl group having 1 to 12 carbon atoms, an aryl group having 6 to 24 carbon atoms, or an arylalkyl group having 6 to 48 carbon atoms, and n is 0 or more.

In Formula 1, $R_1$ is hydrogen, or an alkyl group having 1 to 12, 1 to 8, or 1 to 4 carbon atoms, for example, hydrogen, a methyl group, an ethyl group, a propyl group, a butyl group, a pentyl group, or a hexyl group, and preferably, hydrogen or a methyl group, but the present application is not limited thereto.

In addition, in Formula 1, $R_2$ is an alkylene group having 1 to 6, 1 to 4, or 1 to 2 carbon atoms, and preferably ethylene or propylene, but the present application is not limited thereto.

R₃ is hydrogen, an alkyl group having 1 to 12, 1 to 8, 1 to 6, or 1 to 4 carbon atoms; an aryl group having 6 to 24, 6 to 20, 6 to 18, or 6 to 12 carbon atoms; or an arylalkyl group having 6 to 48, 6 to 30, 6 to 24, or 6 to 18 carbon atoms, and for example, hydrogen, a methyl group, an ethyl group, a propyl group, a phenyl group, a naphthyl group, a butylphenol group, a pentylphenol group, a hexylphenol group, a heptylphenol group, an octylphenol group, or a nonylphenol group, but the present application is not limited thereto.

In addition, n may be 0 or more, for example, 1 or more, and preferably, 2 or more.

In one example, the monomer represented by Formula 1 may be a monomer of Formula 2:

[Formula 2]

In Formula 2, $R_1$ and $R_3$ are defined as described above, p+q is 1 or more, p is 0 to 100, and q is 0 to 100.

As the monomer represented by Formula 1 or 2, for example, at least one selected from the group consisting of methoxyethyl (meth)acrylate, methoxyethoxyethyl (meth)acrylate, ethoxyethoxyethyl (meth)acrylate, ethoxytriethyleneglycol (meth)acrylate, polyethyleneglycol (meth)acrylate, polyethyleneglycolmethylether (meth)acrylate, ethoxylated nonylphenol (meth)acrylate, propoxylated nonylphenol (meth)acrylate, ethoxylated phenol (meth)acrylate, and polypropyleneglycol (meth)acrylate, and preferably, methoxyethyl (meth)acrylate, methoxyethoxyethyl (meth)acrylate, ethoxyethoxyethyl (meth)acrylate, ethoxytriethyleneglycol (meth)acrylate, polyethyleneglycol (meth)acrylate, or polyethyleneglycolmethylether (meth)acrylate may be used, but the present application is not limited thereto.

Since the monomer represented by Formula 1 or 2 includes at least one oxygen atom and exhibits a very high polarity due to the high electronegativity of the oxygen atom, the pressure-sensitive adhesive layer including the monomer may have a high affinity with a polar electrolyte solution, and may be expanded when in contact with the electrolyte. Meanwhile, the term "electrolyte solution" may refer to, for example, a medium for ion conduction used in a secondary battery. In one example, the electrolyte may be a liquid medium, that is, an electrolyte solution, but the present application is not limited thereto. In the specification, the electrolyte solution may also be expressed as an electrolyte.

The polymer may include the monomer represented by Formula 1 in an amount of 30 to 300 parts by weight, for example, 40 to 280 parts by weight or 44 to 250 parts by weight with respect to 100 parts by weight of a (meth)acrylic acid ester monomer in a polymerized form, but the present application is not limited thereto. In addition, the monomer represented by Formula 1 may be included in an amount of 25 to 80 parts by weight, for example, 25 to 75 parts by weight or 30 to 70 parts by weight with respect to 100 parts by weight of the total monomer included in the polymer as a polymerization unit. When too little of the monomer represented by Formula 1 is included, it is difficult for the pressure-sensitive adhesive layer to expand enough to be detached from the electrode assembly when in contact with the electrolyte, and when too much of the monomer represented by Formula 1 is included, due to excessive gelation occurring in a polymerization reaction of the polymer, it may be difficult to realize a pressure-sensitive adhesive property of the pressure-sensitive adhesive. Therefore, in consideration of these problems, a content of a monomer having a polar functional group may be controlled to be within the above-described range. In the specification, unless particularly defined otherwise, the term "parts by weight" refers to a relative weight ratio.

The crosslinkable monomer having a crosslinkable functional group may be a monomer which can be copolymerized with another monomer included in the (meth)acrylic acid ester monomer or polymer, and provide a crosslinking point capable of reacting with a multifunctional crosslinking agent in a main chain of the polymer after copolymerization. Here, the crosslinkable functional group may be a hydroxyl group, a carboxyl group, an isocyanate group, a glycidyl group, or an amide group, or in some cases, a photocrosslinkable functional group such as an acryloyl group or a methacryloyl group. The photocrosslinkable functional group may be introduced by reacting a compound having a photocrosslinkable functional group to a crosslinkable functional group provided by the copolymerizable monomer. As the crosslinkable monomer including a hydroxyl group, for example, a monomer including a hydroxyl group such as hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxyethyleneglycol (meth)acrylate, glycerol (meth)acrylate, or hydroxypropyleneglycol (meth)acrylate, or a monomer in which at least one thereof is mixed may be used, but the present application is not limited thereto. The carboxyl group-containing monomer may be, but is not limited to, for example, (meth)acrylic acid, carboxyethyl (meth)acrylate, carboxypentyl (meth)acrylate, itaconic acid, maleic acid, fumaric acid, or crotonic acid. In addition, the crosslinkable monomer including a glycidyl group may be, but is not limited to, for example, an epoxycycloalkylalkyl (meth)acrylate such as glycidyl (meth)acrylate, an epoxyalkyl (meth)acrylate, or epoxycyclohexylmethyl (meth)acrylate. The crosslinkable monomer including an isocyanate group may be, but is not limited to, for example, 2-isocyanatoethyl (meth)acrylate, 1,1-bis(acryloyloxymethyl)ethyl isocyanate, (meth)acryloyloxy ethyl isocyanate, meth-isopropyl-α,α-dimethylbenzyl isocyanate, methacryloyl isocyanate, or allyl isocyanate; an acryloyl monoisocyanate compound obtained by reacting a diisocyanate compound or a polyisocyanate compound with 2-hydroxyethyl (meth)acrylate; or an acryloyl monoisocyanate compound obtained by reacting a diisocyanate compound or a polyisocyanate compound with a polyol compound and 2-hydroxyethyl (meth)acrylate. The amide group-containing monomer may be, but is not limited to, for example, (meth)acrylamide, diethylacrylamide, N-vinylpyrrolidone, N,N-dimethyl(meth)acrylamide, N,N-diethyl(meth)acrylamide, N,N'-methylenebisacrylamide, N,N-dimethylaminopropylacrylamide, N,N-dimethylaminopropylmethacrylamide, or diacetone(meth)acrylamide. In addition, the amino group-containing monomer may be, but is not limited to, for example, aminoethyl(meth)acrylate, N,N-dimethylaminoethyl(meth)acrylate, or N,N-dimethylaminopropyl(meth)acrylate. The alkoxysilyl group-containing monomer may be, but is not limited to, trimethoxysilylpropyl (meth)acrylate or allyloxyethyl (meth)acrylate.

The polymer may include a crosslinkable monomer in an amount of 0.1 to 10 parts by weight, for example, 2.5 to 10 parts by weight, 2.9 to 9 parts by weight, or 2.9 to 8 parts by weight with respect to 100 parts by weight of a (meth)acrylic acid ester monomer in a polymerized form, but the present application is not limited thereto. In addition, the crosslinkable monomer may be included in an amount of 0.1 to 5 parts by weight, for example, 0.5 to 3 parts by weight or 1 to 2 parts by weight with respect to 100 parts by weight of the total monomer included in the polymer as a polymerization unit. When too much of the crosslinkable monomer is included, due to an excessively low peeling strength, it may be difficult for the pressure-sensitive adhesive layer to fix an electrode assembly, and when too little of the crosslinkable monomer is included, it is difficult for the pressure-sensitive adhesive layer to expand sufficiently to be detached from the electrode assembly when in contact with an electrolyte. In consideration of these problems, a content of the crosslinkable monomer may be controlled to be within the above-described range.

The polymer may further include a functional comonomer as needed in a polymerized form, and for example, may be a monomer represented by Formula 3:

[Formula 3]

In Formula 3, $R_6$ to $R_8$ each independently represent hydrogen or alkyl, $R_9$ represents cyano; phenyl unsubstituted or substituted with alkyl; acetyloxy; or $COR_{10}$), and $R_{10}$ represents amino or glycidyloxy unsubstituted or substituted with alkyl or alkoxyalkyl.

In the definitions of $R_6$ to $R_{10}$ in Formula 3, the alkyl or alkoxy refers to alkyl or alkoxy having 1 to 8 carbon atoms, and preferably, methyl, ethyl, methoxy, ethoxy, propoxy, or butoxy.

A specific example of the monomer of Formula 3 may be, but is not limited to, a nitrogen-containing monomer such as (meth)acrylamide, N-butoxy methyl (meth)acrylamide, N-methyl (meth)acrylamide, (meth)acrylonitrile, N-vinyl pyrrolidone, or N-vinylcaprolactam; a styrene-based monomer such as styrene or methyl styrene; glycidyl (meth) acrylate; caprolactone; or vinyl ester of carboxylic acid such as vinyl acetate.

The polymer may be included in the composition in a crosslinked form by a multifunctional crosslinking agent. When the polymer is included in a crosslinked form, the pressure-sensitive adhesive layer formed of the composition may have an expanding or swelling characteristic when in contact with the electrolyte, thereby preventing a disconnection of an electrode. In addition, as the polymer is included in a crosslinked form, the pressure-sensitive adhesive layer formed of the pressure-sensitive adhesive composition may ensure a suitable cohesive strength.

A type of the multifunctional crosslinking agent crosslinking the polymer is not particularly limited, and the multifunctional crosslinking agent may be a suitable crosslinking agent selected from known crosslinking agents such as an isocyanate crosslinking agent, an epoxy crosslinking agent, an aziridine crosslinking agent, a metal chelate crosslinking agent, a photocrosslinking agent, etc. according to a type of a crosslinkable functional group present in the polymer. Here, the isocyanate crosslinking agent may be a diisocyanate such as tolylene diisocyanate, xylene diisocyanate, diphenylmethane diisocyanate, hexamethylene diisocyanate, isophorone diisocyanate, tetramethylxylene diisocyanate, or naphthalene diisocyanate, or a reaction product of the diisocyanate and a polyol, and as a polyol, trimethylol propane may be used. The epoxy crosslinking agent may be ethyleneglycol diglycidylether, triglycidylether, trimethylolpropane triglycidylether, N,N,N',N'-tetraglycidyl ethylenediamine, or glycerin diglycidylether, and the aziridine crosslinking agent may be N,N'-toluene-2,4-bis(1-aziridine carboxamide), N,N'-diphenylmethane-4,4'-bis(1-aziridine carboxamide), triethylenemelamine, bisisoprothaloyl-1-(2-methylaziridine), or tri-1-aziridinyl phosphineoxide. The metal chelate crosslinking agent may be a compound in which a multifunctional metal such as the multifunctional metal, aluminum, iron, zinc, tin, titanium, antimony, magnesium, or vanadium, etc. coordinates to a compound such as acetyl acetone or ethyl acetoacetate, and the photocrosslinking agent may be a multifunctional acrylate. Here, in consideration of the type of a crosslinkable functional group included in the polymer, one or at least two crosslinking agents may be used.

A weight ratio of the multifunctional crosslinking agent in the pressure-sensitive adhesive composition may be controlled to be within in a range in which a desired peeling strength or a gel fraction that will be described below may be ensured. For example, the crosslinking agent may be included in an amount of 0.001 to 10 parts by weight, for example, 0.1 to 5 parts by weight or 0.5 to 4 parts by weight with respect to 100 parts by weight of the total composition, but the present application is not limited thereto. When the ratio of the multifunctional crosslinking agent is too low, the cohesive strength of the pressure-sensitive adhesive layer may not be suitably ensured, and when the ratio of the multifunctional crosslinking agent is too high, a pressure-sensitive adhesive property may be degraded. Accordingly, a suitable range of the ratio may be selected.

The polymer included in the pressure-sensitive adhesive composition may be prepared by applying a mixture of the monomers to a polymerization process such as solution polymerization, photo polymerization, bulk polymerization, suspension polymerization, or emulsion polymerization.

The polymer may have a weight average molecular weight (Mw) of approximately 300,000 to 2,500,000, 400,000 to 2,000,000, 400,000 to 1,500,000, 400,000 to 1,000,000, 500,000 to 2,000,000, 800,000 to 1,800,000, 600,000 to 1,200,000, 700,000 to 1,400,000, or 600,000 to 800,000. In the specification, the weight average molecular weight may refer to a conversion value for standard polystyrene measured by gel permeation chromatography (GPC), and unless particularly defined otherwise, the molecular weight may refer to a weight average molecular weight. When the molecular weight of the polymer is too low, the cohesive strength of the pressure-sensitive adhesive layer may be degraded, and when the molecular weight of the polymer is too high, the pressure-sensitive adhesive property may be degraded, and therefore, a suitable molecular weight may be selected.

The pressure-sensitive adhesive composition may further include various additives known in the art as needed, in addition to the above-described components. For example, the pressure-sensitive adhesive composition may further include a tackifier. The tackifier may be, but is not limited to, for example, a rosin ester-based or styrene-based tackifier, and as needed, a suitable type may be selected and used. A content of the tackifier is not particularly limited, and may be controlled in consideration of a peeling strength with the electrode assembly. In one example, the tackifier may be used in an amount of 1 to 25 parts by weight with respect to 100 parts by weight of the polymer.

The pressure-sensitive adhesive composition may further include an additive such as an initiator including a thermal initiator or a photoinitiator; an epoxy resin; a curing agent; a UV stabilizer; an antioxidant; a coloring agent; a reinforcing agent; a filler; a foaming agent; a surfactant; a photopolymerizable compound such as a multifunctional acrylate; or a plasticizer within a range that does not have an effect on a desired effect.

In one example, the polymer included in the pressure-sensitive adhesive composition may be prepared through photopolymerization by selecting a suitable photoinitiator generally well known in the art. The photoinitiator may be, but is not limited to, an organic peroxide such as benzoylperoxide, 1,1-bis(tertbutylperoxy)-3,3,5-triethylcyclohexane, tertbutylperoxyacetate, tertbutylperoxybenzoate, tertbutyl peroxy-2-ethylhexanoate, tertbutyl peroxyisopropylcarbonate, di-2-ethylhexylperoxy dicarbonate, diisopropylperoxy dicarbonate, di-3-methoxybutylperoxy dicarbonate, di-3,3,5-trimethylhexanoyl peroxide, di-tert-butyl peroxide, lauroyl peroxide, dicumylperoxide, or methyletherketoneperoxide; a hydroperoxide such as butyl hydroperoxide or cumyl hydroperoxide; an oxidant such as hydrogen peroxide, ammonium peroxodisulfide, nitric acid and a salt thereof, perchloric acid and a salt thereof, sulfuric acid and a salt thereof, hypochlorous acid and a salt thereof, permanganic acid and a salt thereof, chromic acid and a salt thereof, lead dioxide, manganese dioxide, copper oxide, iron chloride, fluorine, chlorine, bromine, or iodine; a reductant such as sodiumborohydride, formaldehyde, acetaldehyde, amine, or hydrazine; an azo compound such as azobisisobutyronitrile (AIBN); a means for radiating heat, a UV ray, or a high energy wavelength; or electron transfer in an electrolyte, which may be applied to the photopolymerization.

A content of the photoinitiator may be, but is not particularly limited to, 0.01 to 5 parts by weight, for example, 0.01 to 1 parts by weight or 0.01 to 0.5 part by weight with respect to 100 parts by weight of the total monomer mixture.

The pressure-sensitive adhesive layer 11 may be formed by coating a coating solution prepared by mixing the polymer with a multifunctional crosslinking agent on the base layer 12, and inducing a crosslinking reaction between the polymer and the multifunctional crosslinking agent under suitable conditions.

A thickness of the pressure-sensitive adhesive layer 11 may be suitably selected according to a use, for example, a desired peeling strength, but the present application is not particularly limited thereto. The pressure-sensitive adhesive layer 11 may be formed to have a thickness of approximately, for example, 2 to 100 μm, 3 to 50 μm, 4 to 25 μm, 2 to 15 μm, 4 to 10 μm, 4 to 9 μm, 4 to 7 μm, 5 to 9 μm, or 5 to 7 μm, but may vary according to its use.

The seal tape 10 may be adhered to a circumferential surface of the electrode assembly in the secondary battery. In addition, the seal tape according to exemplary embodiments of the present application includes the pressure-sensitive adhesive layer 11 which does not have an excessively high initial peeling strength, and includes the above-described monomer having a polar functional group. Therefore, when the seal tape 10 is in contact with an electrolyte solution in the secondary battery, the pressure-sensitive adhesive layer 11 absorbs the electrolyte solution and is expanded, and thus the peeling strength of the pressure-sensitive adhesive 11 may be controlled to be low in order to be detached from the electrode assembly.

In one example, the seal tape 10 of the present application may have an initial peeling strength sufficient to fix the electrode assembly and be detached from the electrode assembly when in contact with an electrolyte. When the initial peeling strength of the electrode assembly is too high, after a contact with the electrolyte, the pressure-sensitive adhesive layer 11 may be difficult to be detached from an electrode assembly 22. For example, the pressure-sensitive adhesive layer 11 may have a peeling strength at room temperature measured at a peeling rate of 5 mm/sec and a peeling angle of 180 degrees of 370 gf/25 mm or less, for example, 350 gf/25 mm or less, 315 gf/25 mm or less, or 312 gf/25 mm or less, with respect to glass. The lower limit of the peeling strength of the pressure-sensitive adhesive layer 11 with respect to glass is not particularly limited, and for example, when it has a very low initial peeling strength, the pressure-sensitive adhesive layer loses a pressure-sensitive adhesive strength when in contact with an electrolyte solution, and therefore, the seal tape is detached from the electrode assembly, and thereby a disconnection of the electrode may be prevented. However, when the initial peeling strength of the pressure-sensitive adhesive layer 11 is too low, the electrode assembly may unroll without contacting the electrolyte solution before the electrode assembly is accommodated in a can. In consideration of this, the lower limit of the peeling strength of the pressure-sensitive adhesive layer 11 to glass may be controlled to be 5 gf/25 mm or more, for example, 10 gf/25 mm or more, 20 gf/25 mm or more, 30 gf/25 mm or more, 40 gf/25 mm or more, 50 gf/25 mm or more, 60 gf/25 mm or more, 70 gf/25 mm or more, 80 gf/25 mm or more, 85 gf/25 mm or more, or 88 gf/25 mm or more. When the pressure-sensitive adhesive layer 11 has a peeling strength in the above range with respect to glass, even when the pressure-sensitive adhesive layer 11 is attached to a circumferential surface of the electrode assembly, it may have a suitable initial peeling strength to be detached when being in contact with the electrolyte solution, and form a stereoscopic structure having a specific surface roughness when the seal tape 10 is in contact with the electrolyte solution. The circumferential surface of the electrode assembly may be, for example, a separation film or a glass stacked on the separation film.

In addition, the seal tape 10 of the present application forms a stereoscopic structure since the pressure-sensitive adhesive layer 11 absorbs an electrolyte solution and is expanded when in contact with the electrolyte solution, and the peeling strength of the pressure-sensitive adhesive layer 11 may be controlled to be low such that the pressure-sensitive adhesive layer 11 is detached from the electrode assembly, and thus the pressure-sensitive adhesive layer 11 may be detached from the circumferential surface of the electrode assembly. In one example, the seal tape 10 may be detached from the circumferential surface of the electrode assembly after a contact with the electrolyte solution, and preferably, 50% or more, for example, 60% or more, 70% or more, or 80% or more of an area in which the seal tape 10 is adhered to the circumferential surface of the electrode assembly may be detached.

A thickness of the seal tape 10 may be suitably selected according to a desired peeling strength, but is not particularly limited. The seal tape 10 may be formed to have a thickness of approximately, for example, 10 to 100 μm, 15 to 75 μm, 20 to 45 μm, 15 to 40 μm, 20 to 40 μm, or 20 to 30 μm, but the thickness may be changed according to its use. When the thickness of the seal tape 10 is too small, an effect according to the expansion of the pressure-sensitive adhesive layer 11 of the seal tape 10 may be difficult to be exhibited, and when the thickness of the seal tape 10 is too large, the thickness of the electrode assembly is also increased, thereby damaging the electrode assembly due to degraded processability when being inserted into a battery case, or reducing a capacity compared to other batteries having the same specification.

The seal tape 10 may further include a releasing sheet adhered to the pressure-sensitive adhesive 11 to protect the pressure-sensitive adhesive layer 11 before the tape is used.

In still another aspect, the present application provides a secondary battery.

Figure 2:
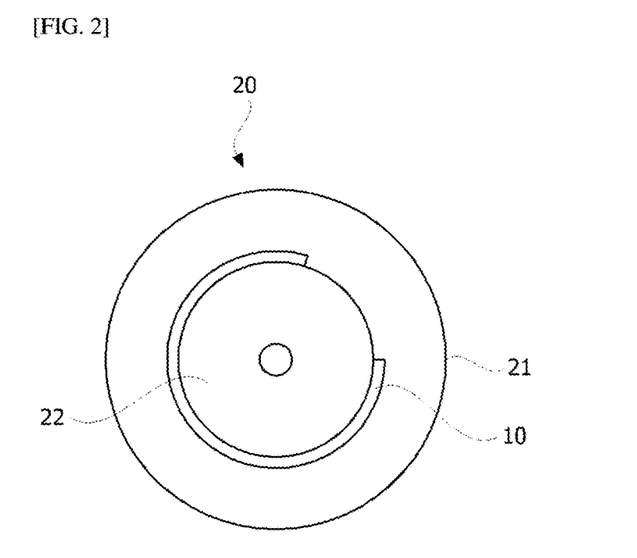
FIG. 2 is a schematic diagram of an exemplary secondary battery of the present application.

FIG. 2 is a schematic diagram of an exemplary secondary battery of the present application.

In one example, a secondary battery 20 includes, as shown in FIG. 2, an electrode assembly 22 and a seal tape 10 adhered to a circumferential surface of the electrode assembly 22 by means of a pressure-sensitive adhesive layer 11. Descriptions of the seal tape 10 and the pressure-sensitive adhesive layer 11 are the same as described above, and thus will be omitted.

In the secondary battery 20 of the present application, as the seal tape 10 is expanded while being fixed to the electrode assembly 22 by means of the pressure-sensitive adhesive layer 11 formed on the base layer 12 and in contact with an electrolyte, a peeling strength with respect to the electrode assembly 22 is decreased, and thereby the pressure-sensitive adhesive layer 11 may be detached from the electrode assembly 22.

To detach the pressure-sensitive adhesive layer 11 from the electrode assembly 22 when the pressure-sensitive adhesive layer 11 is in contact with an electrolyte, the pressure-sensitive adhesive layer 11 may be designed to have a suitable initial peeling strength. For example, when the initial peeling strength of the electrode assembly is too high, it may be difficult for the pressure-sensitive adhesive layer 11 to be detached from the electrode assembly 22 after a contact with the electrolyte. A peeling strength of the pressure-sensitive adhesive layer with respect to the electrode assembly at room temperature, measured at a peeling rate of 5 mm/sec and a peeling angle of 180 degrees, may be, for example, 1200 gf/25 mm or less, 1000 gf/25 mm or less, 900 gf/25 mm or less, 800 gf/25 mm or less, 700 gf/25 mm or less, or 600 gf/25 mm or less. The lower limit of the peeling strength of the pressure-sensitive adhesive layer 11 to the electrode assembly is not particularly limited, and for example, when the pressure-sensitive adhesive layer 11 has a very low initial peeling strength, it may lose a pressure-sensitive adhesive strength when in contact with an electrolyte solution, and therefore the seal tape is detached from the electrode assembly, and thereby a disconnection of an electrode may be prevented. However, when the initial peeling strength of the pressure-sensitive adhesive layer 11 is too low, the electrode assembly may unroll without a contact with the electrolyte solution before being accommodated in a can, and in consideration of this phenomenon, the lower limit of the peeling strength of the pressure-sensitive adhesive layer 11 may be controlled to be 5 gf/25 mm or more, 10, gf/25 mm or more 20 gf/25 mm or more, 25 gf/25 mm or more, 45 gf/25 mm or more, 65 gf/25 mm or more, 70 gf/25 mm or more, 80 gf/25 mm or more, 85 gf/25 mm or more, or 90 gf/25 mm or more. A circumferential surface of the electrode assembly may be, for example, a separation film, and the peeling strength may be, for example, a peeling strength with respect to the separation film. When the pressure-sensitive adhesive layer 11 has the above range of peeling strength with respect to the electrode assembly or the separation film, even when the pressure-sensitive adhesive layer 11 is adhered to the circumferential surface of the electrode assembly, it may have a suitable initial peeling strength to be detached when in contact with the electrolyte solution, and when the seal tape 10 is in contact with the electrolyte solution, a stereoscopic structure having a specific surface roughness is formed, and thus the seal tape 10 may be effectively detached from the electrode assembly.

The pressure-sensitive adhesive layer 11 reacts with the electrolyte solution, and thus a peeling strength between the pressure-sensitive adhesive layer 11 and the electrode assembly 22 may be decreased. As the peeling strength is decreased, as described above, the pressure-sensitive adhesive layer 11 may be detached from the electrode assembly 22. As described above, as the seal tape 10 is detached from the electrode assembly 22, isotropic volume expansion and contraction of the electrode assembly 22 may be induced, and a disconnection phenomenon in which an electrode is disconnected may be prevented.

The pressure-sensitive adhesive layer 11 of the seal tape 10 may be expanded when in contact with an electrolyte, and form a stereoscopic structure as described above.

The secondary battery 20 may be manufactured by, for example, adhering the seal tape 10 to the electrode assembly 22, accommodating the electrode assembly 22 in a can 21, injecting an electrolyte into the can 21, and sealing the can 21.

A type of the electrode assembly 22 is not particularly limited, and may be any one of the assemblies generally used in the art. In one example, the electrode assembly 22 may be an electrode assembly 22 for a secondary battery 20, for example, a lithium secondary battery.

The electrode assembly 22 may include a positive electrode plate, a negative electrode plate, and a separation film interposed between the positive electrode plate and the negative electrode plate, and in the method, the seal tape may be adhered to the circumferential surface of the electrode assembly 22 by means of the pressure-sensitive adhesive layer 11. The electrode assembly 22 may be rolled in a jelly roll shape in some cases.

The positive electrode plate may include a positive electrode current collector consisting of a metal thin plate or the like having excellent conductivity; and a positive electrode active material layer coated on a surface of the positive electrode current collector. In addition, at both ends of the positive electrode plate, a region in which the positive electrode active material layer is not coated is formed, and a positive electrode tab protruding upward or downward from the electrode assembly 22 to a predetermined length may be adhered to the region. The positive electrode tab may serve to electrically connect the electrode assembly 22 with another part of the battery.

In addition, the negative electrode plate may include a negative electrode current collector consisting of a conductive metal thin plate or the like; and a negative electrode active material layer coated on a surface of the negative electrode current collector. In addition, similar to the positive electrode plate, at both ends of the negative electrode plate, a region in which the negative electrode active material layer is not coated is formed, and a negative electrode tab protruding upward or downward from the electrode assembly 22 to a predetermined length may be adhered to the region. The negative electrode tab electrically connecting the electrode assembly 22 with another part of the battery may be adhered to the region.

In addition, the electrode assembly 22 further includes an insulating plate formed on and/or under the electrode assembly 22 to prevent contact with a cap assembly or a cylindrical can 21.

The seal tape 10 may be adhered to surround the circumferential surface to include a closing part in which the outermost end of the separation film on the circumferential surface of the electrode assembly 22 is located. In addition, the seal tape 10 may be adhered to cover at least 30% or more of the total area of the circumferential surface of the electrode assembly 22, and top and bottom ends of the circumferential surface of the electrode assembly 22 may be adhered such that the assembly is exposed.

A type of the can 21 in which the electrode assembly 22 is accommodated is not particularly limited, and for example, may be a cylindrical can 21 known in the art.

In addition, here, a type of the electrolyte solution, which is a liquid for transforming, for example, expanding the pressure-sensitive adhesive layer 11 of the seal tape 10, is not particularly limited, and according to the battery type, an electrolyte solution known in the art is used. For example, when the battery is a lithium secondary battery, the electrolyte may include, for example, a non-aqueous organic solvent and a lithium salt. Here, the lithium salt may be dissolved in the organic solvent to serve as a source of lithium ions in the battery, and may stimulate transfer of lithium ions between the positive electrode and the negative electrode. The lithium salt may include one or at least two of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (wherein x and y are natural numbers), LiCl, LiI, and lithium bisoxalate borate as a supporting electrolyte salt. A concentration of the lithium salt in the electrolyte may be changed according to its use, and may be, generally, 0.1 to 2.0 M. In addition, the organic solvent may serve as a medium in which ions involved in an electrochemical reaction of the battery can be transferred, and may be, but is not limited to, for example, one or at least two of benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (wherein R is a linear, branched, or cyclic hydrocarbon group having 2 to 50 carbon atoms, the hydrocarbon group including a double bond, an aromatic ring, or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methylpropyl carbonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, dimethyl carbonate, γ-butyrolactone, sulfolane, valerolactone, decanolide, and mevalolactone.

In one example, a length of the seal tape 10 may be 50 to 90%, preferably 60 to 80%, of the length of the circumferential surface of the electrode assembly 22. The seal tape 10 is adhered to cover the circumferential surface of the electrode assembly 22, and the length of the seal tape 10 may be determined to minimize an occupied space in the battery. Specifically, when the length of the seal tape 10 is too short, a buffering effect and an increase in a frictional force of the gelated seal tape 10 with respect to an inner surface of the battery can 21 are not sufficiently large, and thus it is difficult to obtain desired effects. Contrarily, when the length of the seal tape 10 is too long, the occupied space in the battery can 21 becomes unnecessarily larger, resulting in degrading capacity compared to other battery cans with the same specification.

In addition, as shown in FIG. 2, the secondary battery 20 may be a cylindrical lithium ion secondary battery, which may have high price efficiency and a high electric capacity.

Advantageous Effects

A seal tape for adhering an electrode assembly which can be detached from the electrode assembly by contact with an electrolyte solution, in which expansion of a pressure sensitive adhesive layer is provided to induce isotropic volume expansion and contraction of the electrode assembly during repeated charging and discharging of a secondary battery and prevent a disconnection phenomenon in which an electrode is disconnected.

MODE FOR INVENTION

Hereinafter, the present application will be described in detail with reference to examples and comparative examples, but the scope of the present application is not limited to the following examples.

Physical properties presented in the examples and comparative examples were evaluated by the following methods.

1. Evaluation of Weight Average Molecular Weight

A weight average molecular weight of a pressure-sensitive adhesive composition was measured using GPC under the following conditions. Standard polystyrene produced by Agilent Technologies was used to provide a calibration curve, and measurement results were converted.

<Conditions for Measuring Weight Average Molecular Weight>

Measuring Tool: Agilent GPC (Agilent 1200 series, U.S.)
Column: Two connected PL mixed B
Column Temperature: 40° C.

Eluent: Tetrahydrofuran
Flow Rate: 1.0 mL/min
Concentration: ~2 mg/mL (100 μL injection)

2. Measurement of Peeling Strength to Glass

A specimen was prepared by cutting a seal tape to have a size of 25 mm×200 mm (width×length). Afterward, the specimen was adhered to a glass plate by means of a pressure-sensitive adhesive layer using a 2 kg rubber roller, stored at room temperature for approximately 2 hours, and a peeling strength was measured while the seal tape was peeled at a peeling rate of 5 mm/sec and a peeling angle of 180 degrees using a tension tester.

3. Measurement of Peeling Strength to Separation Film

A specimen was prepared by cutting a seal tape to have a size of 25 mm×200 mm (width×length). Afterward, the specimen was adhered to a separation film (SRS olefin-based separation film) of an electrode assembly by means of a pressure-sensitive adhesive layer using a 2 kg rubber roller, stored at room temperature for approximately 2 hours, and a peeling strength was measured while the seal tape was peeled at a peeling rate of 5 mm/sec and a peeling angle of 180 degrees using a tension tester. When the peeling strength exceeded 400 gf/25 mm, the separation film was separated and broken, and therefore it was impossible to measure the peeling strength.

4. Observation of Surface Shape

Figure 3:
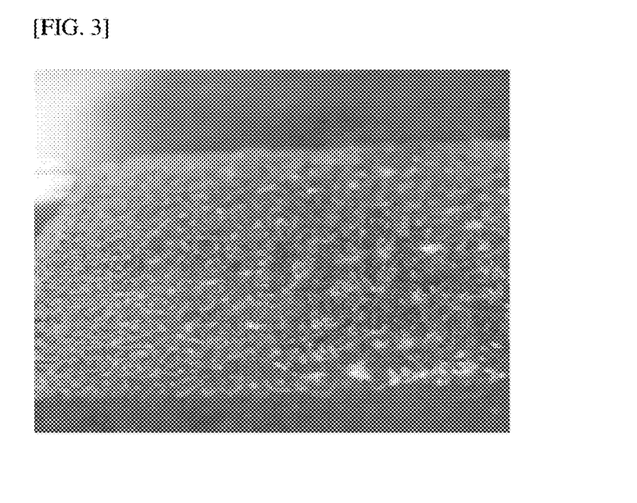
FIG. 3 is an image of a stereoscopic structure formed after a seal tape of Example 1 of the present application is in contact with an electrolyte.
Figure 4:
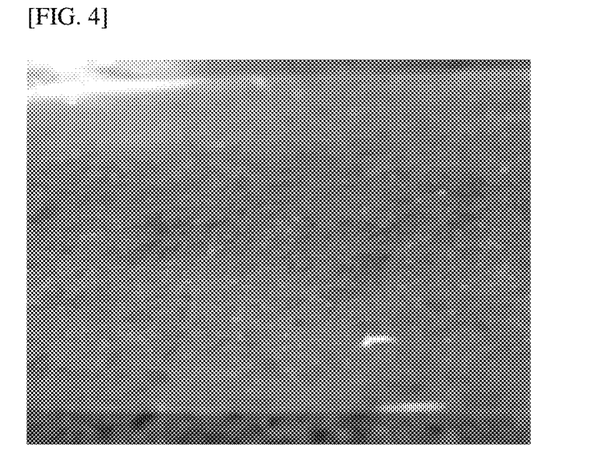
FIG. 4 is an image of a surface after a seal tape of Comparative Example 1 of the present application is in contact with an electrolyte.

Specimens prepared by the methods of the examples or comparative examples were dipped in a carbonate-based electrolyte, maintained in a sealed state at room temperature for 1 day, and removed from the electrolyte to take a photograph of a surface shape using a digital camera. The images are shown in FIGS. 3 and 4.

In addition, the surface shape of the seal tape was observed, and whether a stereoscopic structure was or was not observed was evaluated according to the following criteria:

<Criteria for Evaluating Whether Stereoscopic Structure was or was not Formed>

○: A stereoscopic structure was apparently observed with the naked eye.

Δ: A stereoscopic structure was not observed with the naked eye.

x: There was no stereoscopic structure.

5. Measurement of Center Line Average Roughness (Ra)

Figure 5:
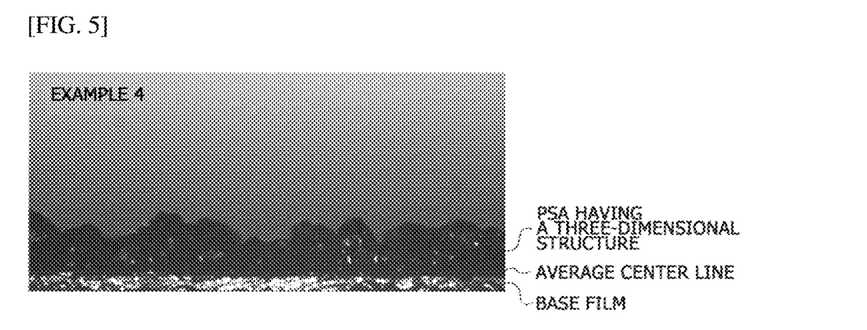
FIG. 5 is an image of a cross-section of a stereoscopic structure formed after a seal tape of Example 4 of the present application is in contact with an electrolyte.
Figure 6:
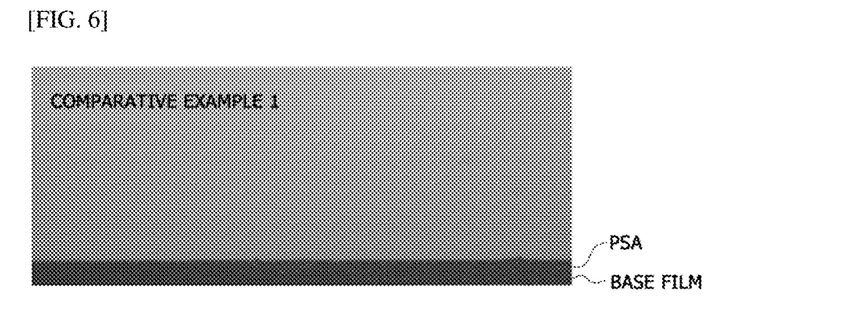
FIG. 6 is an image of a cross-section of the seal tape of Comparative Example 1 of the present application after a contact with an electrolyte.

Specimens prepared by the methods of Example 4 and Comparative Example 1 were dipped in a carbonate-based electrolyte, maintained in a sealed state at room temperature for 1 day, and removed from the electrolyte to take a photograph of a cross-section of the specimen using an optical microscope, and then the images are shown in FIGS. 5 and 6. In Example 4, as a pressure-sensitive adhesive layer absorbed an electrolyte solution to form a stereoscopic structure, the pressure-sensitive adhesive layer had a certain haze, thereby clearly observing an interface with a transparent PET base. However, in Comparative Example 1, the pressure-sensitive adhesive layer did not absorb the electrolyte solution, did not have a haze, and thus it was difficult to observe an interface between a transparent pressure-sensitive adhesive layer and a PET base with the naked eye.

Figure 7:
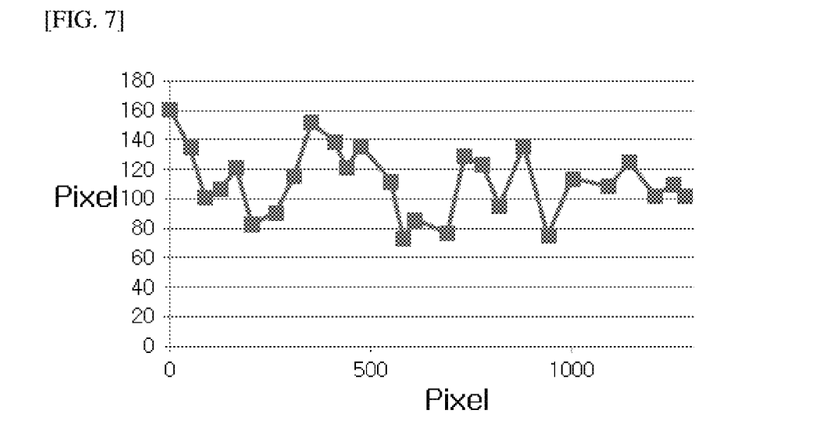
FIG. 7 is a surface roughness graph obtained by mathematically modeling the cross-section of the stereoscopic structure formed after the seal tape of Example 4 of the present application is in contact with an electrolyte.
Figure 8:
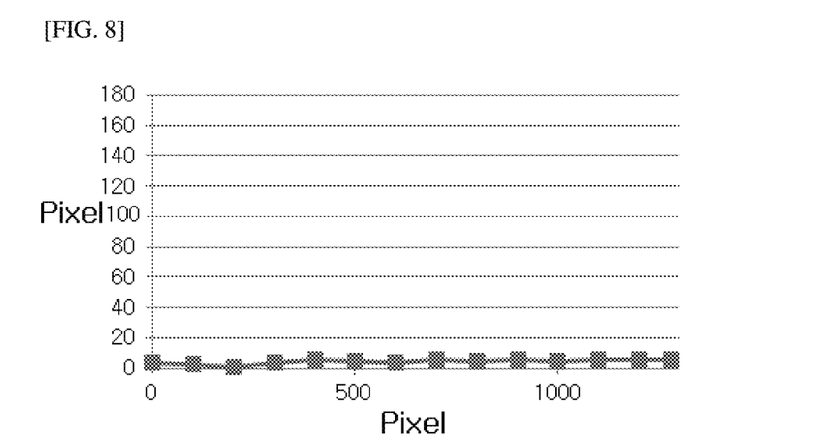
FIG. 8 is a surface roughness graph obtained by mathematically modeling the cross-section of the seal tape of Comparative Example 1 of the present application after a contact with an electrolyte.

A pixel value of a photograph of a cross-section of the specimen of Example 4 or Comparative Example 1 was calculated, the number of the pixels were converted into a length using a dimension of a ruler and mathematically remodeled to obtain surface roughness curves shown in FIGS. 7 and 8, respectively, and a center line average roughness value was calculated by a method that will be described below. Specifically, in the roughness curve, a standard length (L) was extracted by approximately 2.3 mm in a direction of an average line, an average line direction was represented as an x axis, a longitudinal direction was represented as a y axis, a roughness curve was represented by y=f(x), and a center line average roughness value was obtained from Equation 1:

$$R_a = \frac{1}{L}\int_0^L |f(x)|\,dx \qquad \text{[Equation 1]}$$

6. Observation of Detachment

Seal tape specimens (width×length=50 mm×57 mm) prepared by the methods of the examples or comparative examples were adhered to an electrode assembly (length 60 mm×diameter 17 mm), the electrode assembly was dipped in a carbonate-based electrolyte, a phenomenon of detaching the seal tape from a surface of the electrode assembly was observed, a detached area was calculated by measuring a width and a length, and then a ratio of the detached area with respect to an area adhered to the electrode assembly (625 mm$^2$) was calculated.

7. Evaluation of Battery Performance

A cylindrical battery was configured by adhering seal tape specimens prepared by the methods of the examples or comparative examples to an electrode assembly, inserting the electrode assembly into an exterior can, injecting an electrolyte solution into the exterior can, and sealing the exterior can. Four cylindrical battery samples prepared as described above were prepared, charging and discharging were repeated 10 times for each sample, the battery was disassembled to take the electrode assembly apart, and formation of cracks were observed while a positive electrode/a separation film/a negative electrode/a separation film were disassembled.

Preparation Example 1. Preparation of Polymer (A1)

A monomer mixture composed of 58 parts by weight of n-butyl acrylate (n-BA), 40 parts by weight of methoxy ethyl acrylate (MEA), and 2 parts by weight of hydroxybutyl acrylate (HBA), and 0.02 parts by weight of n-dodecanethiol as a chain transferring agent were put into a 1000 cc reaction vessel in which a nitrogen gas is refluxed and a cooling system is equipped to easily control a temperature, and 150 parts by weight of ethyl acetate (EAc) was added as a solvent. Afterward, to remove oxygen, a nitrogen gas was purged at 60° C. for 60 minutes, and then the resulting mixture was maintained at 60° C. The mixture was homogenized, and 0.04 part by weight of azobisisobutyronitrile (AIBN) was added as a reaction initiator. The mixture was reacted for 8 hours, thereby preparing a polymer (A1) having a weight average molecular weight of 800,000. Here, the parts by weight are represented by wt %.

Preparation Example 2. Preparation of Polymer (A2)

A polymer (A2) having a weight average molecular weight of 700,000 was prepared by the same method as described in Preparation Example 1, except that 40 parts by weight of methoxy ethoxy ethyl acrylate (MOEOEA) was added instead of 40 parts by weight of methoxy ethyl acrylate used in Preparation Example 1. Here, the parts by weight are represented by wt %.

Preparation Example 3. Preparation of Polymer (A3)

A polymer (A3) having a weight average molecular weight of 600,000 was prepared by the same method as described in Preparation Example 1, except that 40 parts by weight of ethoxy ethoxy ethyl acrylate (EOEOEA) was added instead of 40 parts by weight of methoxy ethyl acrylate used in Preparation Example 1. Here, the parts by weight are represented by wt %.

Preparation Example 4. Preparation of Polymer (A4)

A polymer (A4) having a weight average molecular weight of 780,000 was prepared by the same method as described in Preparation Example 1, except that 68 parts by weight of n-BA, 30 parts by weight of MEA, and 2 parts by weight of HBA were added instead of 58 parts by weight of n-BA, 40 parts by weight of MEA, and 2 parts by weight of HBA used in Preparation Example 1. Here, the parts by weight are represented by wt %.

Preparation Example 5. Preparation of Polymer (A5)

A polymer (A5) having a weight average molecular weight of 790,000 was prepared by the same method as described in Preparation Example 1, except that 48 parts by weight of n-BA, 50 parts by weight of MEA, and 2 parts by weight of HBA were added instead of 58 parts by weight of n-BA, 40 parts by weight of MEA, and 2 parts by weight of HBA used in Preparation Example 1. Here, the parts by weight are represented by wt %.

Preparation Example 6. Preparation of Polymer (A6)

A polymer (A6) having a weight average molecular weight of 750,000 was prepared by the same method as described in Preparation Example 1, except that 38 parts by weight of n-BA, 60 parts by weight of MEA, and 2 parts by weight of HBA were added instead of 58 parts by weight of n-BA, 40 parts by weight of MEA, and 2 parts by weight of HBA used in Preparation Example 1. Here, the parts by weight are represented by wt %.

Preparation Example 7. Preparation of Polymer (A7)

A polymer (A7) having a weight average molecular weight of 730,000 was prepared by the same method as described in Preparation Example 1, except that 28 parts by weight of n-BA, 70 parts by weight of MEA, and 2 parts by weight of HBA were added instead of 58 parts by weight of n-BA, 40 parts by weight of MEA, and 2 parts by weight of HBA used in Preparation Example 1. Here, the parts by weight are represented by wt %.

Preparation Example 8. Preparation of Polymer (B1)

A polymer (B1) having a weight average molecular weight of 800,000 was prepared by the same method as described in Preparation Example 1, except that a monomer mixture composed of 98 parts by weight of n-butyl acrylate and 2 parts by weight of hydroxybutyl acrylate was added and methoxy ethyl acrylate used in Preparation Example 1 was not added. Here, the parts by weight are represented by wt %.

Preparation Example 9. Preparation of Polymer (B2)

A polymer (B2) having a weight average molecular weight of 800,000 was prepared by the same method as described in Preparation Example 1, except that a monomer mixture composed of 93 parts by weight of n-butyl acrylate and 7 parts by weight of acrylic acid was added and methoxy ethyl acrylate used in Preparation Example 1 was not added. Here, the parts by weight are represented by wt %.

Preparation Example 10. Preparation of Polymer (B3)

A polymer (B3) having a weight average molecular weight of 790,000 was prepared by the same method as described in Preparation Example 1, except that 88 parts by weight of n-BA, 10 parts by weight of MEA, and 2 parts by weight of HBA were added instead of 58 parts by weight of n-BA, 40 parts by weight of MEA, and 2 parts by weight of HBA used in Preparation Example 1. Here, the parts by weight are represented by wt %.

Preparation Example 11. Preparation of Polymer (B4)

A polymer (B4) having a weight average molecular weight of 800,000 was prepared by the same method as described in Preparation Example 1, except that 78 parts by weight of n-BA, 20 parts by weight of MEA, and 2 parts by weight of HBA were added instead of 58 parts by weight of n-BA, 40 parts by weight of MEA, and 2 parts by weight of HBA used in Preparation Example 1. Here, the parts by weight are represented by wt %.

Example 1

Preparation of Pressure-Sensitive Adhesive Composition 0.3 part by weight of a tolylene diisocyanate adduct of trimethylol propane as a multifunctional isocyanate-based crosslinking agent was put into an ethyl acetate solution with respect to 100 parts by weight of the prepared polymer (A1), diluted to a suitable concentration in consideration of coatability, and uniformly mixed.

Preparation of Seal Tape

The pressure-sensitive adhesive composition prepared in Example 1 was coated and dried on one surface of a poly(ethylene terephthalate) (PET) film (thickness: 19 µm), thereby forming a uniform coating layer having a thickness of 6 µm. Subsequently, a releasing film was laminated on the coating layer, and aged for 3 days under conditions of a constant temperature (25° C.) and a constant humidity, thereby preparing a seal tape.

Formation of Electrode Assembly and Battery

A seal tape was adhered to cover approximately 50% of an area of a circumference of an electrode assembly (diameter of cross-section: 17.2 mm) formed in a jelly roll shape including a negative electrode, a positive electrode, and a separation film, and the assembly was inserted into a cylindrical can (diameter of cross-section: 17.5 mm). Subsequently, a carbonate-based electrolyte was injected into the can and sealed, and therefore a battery was completed.

Examples 2 to 11 and Comparative Examples 1 to 4

In the preparation of the seal tape, a composition ratio of the pressure-sensitive adhesive layer was changed as shown in Tables 1 and 2, and a seal tape and a battery were formed by the same method as described in Example 1.

TABLE 1

|  |  | Example |  |  |  |  |  |  |
|---|---|---|---|---|---|---|---|---|
|  |  | 1 | 2 | 3 | 4 | 5 | 6 | 7 |
| Base layer | Type | PET | PET | PET | PET | PET | PET | PET |
|  | Thickness | 19 μm | 19 μm | 19 μm | 19 μm | 19 μm | 19 μm | 19 μm |
| Pressure sensitive adhesive layer | Acrylic copolymer | Preparation Example 1 (A1) | Preparation Example 1 (A1) | Preparation Example 1 (A1) | Preparation Example 1 (A1) | Preparation Example 1 (A1) | Preparation Example 2 (A2) | Preparation Example 3 (A3) |
|  | Acrylic copolymer Composition ratio | BA/MEA/HBA = 58/40/2 | BA/MEA/HBA = 58/40/2 | BA/MEA/HBA = 58/40/2 | BA/MEA/HBA = 58/40/2 | BA/MEA/HBA = 58/40/2 | BA/MOEOEA/HBA = 58/40/2 | BA/EOEOEA/HBA = 58/40/2 |
|  | Molecular weight | 800,000 | 800,000 | 800,000 | 800,000 | 800,000 | 700,000 | 600,000 |
|  | Isocyanate curing agent (parts by weight) | 0.5 | 1 | 1.5 | 2 | 4 | 2 | 2 |
|  | Thickness | 6 μm | 6 μm | 6 μm | 6 μm | 6 μm | 6 μm | 6 μm |

TABLE 2

|  |  | Example |  |  |  | Comparative Example |  |  |  |
|---|---|---|---|---|---|---|---|---|---|
|  |  | 8 | 9 | 10 | 11 | 1 | 2 | 3 | 4 |
| Base layer | Type | PET | PET | PET | PET | PET | PET | PET | PET |
|  | Thickness | 19 μm | 19 μm | 19 μm | 19 μm | 19 μm | 19 μm | 19 μm | 19 μm |
| Pressure sensitive adhesive layer | Acrylic copolymer | Preparation Example 4 (A4) | Preparation Example 5 (A5) | Preparation Example 6 (A6) | Preparation Example 7 (A7) | Preparation Example 8 (B1) | Preparation Example 9 (B2) | Preparation Example 10 (B3) | Preparation Example 11 (B4) |
|  | Composition ratio | BA/MEA/HBA = 68/30/2 | BA/MEA/HBA = 48/50/2 | BA/MEA/HBA = 38/60/2 | BA/MEA/HBA = 28/70/2 | BA/HBA = 98/2 | BA/AA = 93/7 | BA/MEA/HBA = 88/10/2 | BA/MEA/HBA = 78/20/2 |
|  | Molecular weight | 780,000 | 790,000 | 750,000 | 730,000 | 800,000 | 800,000 | 790,000 | 800,000 |
|  | Isocyanate curing agent (parts by weight) | 2 | 2 | 2 | 2 | 2 | 1 | 2 | 2 |
|  | Thickness | 6 μm | 6 μm | 6 μm | 6 μm | 6 μm | 6 μm | 6 μm | 6 μm |

Physical properties measured for Examples and Comparative Examples are summarized and listed in Tables 3 and 4.

TABLE 3

|  | Example |  |  |  |  |  |  |
|---|---|---|---|---|---|---|---|
|  | 1 | 2 | 3 | 4 | 5 | 6 | 7 |
| Peeling strength to glass (gf/25 mm) | 312 | 274 | 236 | 182 | 172 | 221 | 197 |
| Peeling strength to separation film (gf/25 mm) | 400 or more (separation film was separated) | 400 or more (separation film was separated) | 400 or more (separation film was separated) | 93 | 29 | 102 | 96 |
| Detachment after electrolyte solution injection (Detached area/Adhered area × 100) | ○ (50%) | ○ (70%) | ○ (100%) | ○ (100%) | ○ (100%) | ○ (100%) | ○ (100%) |
| Formation of stereoscopic structure after | ○ | ○ | ○ | ○ | ○ | ○ | ○ |

TABLE 3-continued

|  | Example | | | | | | |
|---|---|---|---|---|---|---|---|
|  | 1 | 2 | 3 | 4 | 5 | 6 | 7 |
| being dipped in electrolyte solution | | | | | | | |
| Center line average roughness of stereoscopic structure Ra (μm) | 193 | 186 | 177 | 195 | 198 | 201 | 213 |
| Evaluation of battery performance | One of the four batteries had a crack | One of the four batteries had a crack | No crack | No crack | No crack | No crack | No crack |

TABLE 4

|  | Example | | | | Comparative Example | | | |
|---|---|---|---|---|---|---|---|---|
|  | 8 | 9 | 10 | 11 | 1 | 2 | 3 | 4 |
| Peeling strength to glass (gf/25 mm) | 88 | 183 | 195 | 205 | 58 | 374 | 44 | 67 |
| Peeling strength to separation film (gf/25 mm) | 99 | 150 | 179 | 188 | 52 | 400 or more (separation film was separated) | 47 | 61 |
| Detachment after electrolyte solution injection (Detached area/Adhered area × 100) | ○ (100%) | ○ (100%) | ○ (100%) | ○ (100%) | x | x | x | x |
| Formation of stereoscopic structure after being dipped in electrolyte solution | ○ | ○ | ○ | ○ | x | x | x | Δ |
| Center line average roughness of stereoscopic structure Ra (μm) | 156 | 196 | 227 | 230 | 1.4 | 1.3 | 3.7 | 68 |
| Evaluation of battery performance | No crack | No crack | No crack | No crack | All of the four batteries had cracks | All of the four batteries had cracks | All of the four batteries had cracks | Two of the four batteries had cracks |

What is claimed is:

1. A seal tape in combination with an electrode assembly, comprising:
   a base layer;
   a pressure-sensitive adhesive layer formed on one surface of the base layer,
   wherein a surface of the pressure-sensitive adhesive layer opposite the base layer forms a three-dimensional stereoscopic structure by absorbing an electrolyte solution and being expanded after a contact with the electrolyte solution,
   wherein the surface having the three-dimensional stereoscopic structure has a center line average roughness of 100 to 250 μm, which is measured after 24 hours from the point of the contact with the electrolyte solution; and
   an electrode assembly having a circumferential surface and including an electrolyte solution, said seal tape adhered to a predetermined area of said circumferential surface of said electrode assembly, wherein 50% or more of said predetermined area is detached after contact with the electrolyte solution.

2. The seal tape according to claim 1, wherein the pressure-sensitive adhesive layer includes a cured product of a pressure-sensitive adhesive composition including a polymer having a polymerization unit derived from a (meth)

acrylic acid ester monomer, a monomer represented by Formula 1, and a crosslinkable monomer containing a crosslinkable functional group:

[Formula 1]

where $R_1$ represents hydrogen or an alkyl group having 1 to 12 carbon atoms, $R_2$ represents an alkylene group having 1 to 6 carbon atoms, $R_3$ represents hydrogen, an alkyl group having 1 to 12 carbon atoms, an aryl group having 6 to 24 carbon atoms, or an arylalkyl group having 6 to 48 carbon atoms, and n is 0 or more.

3. The seal tape according to claim 2, wherein the monomer represented by Formula 1 is a monomer of Formula 2:

[Formula 2]

where $R_1$ and $R_3$ are defined as described in Formula 1, p+q is 1 or more, p is 0 to 100, and q is 0 to 100.

4. The seal tape according to claim 2, wherein the monomer represented by Formula 1 is at least one selected from methoxyethyl (meth)acrylate, methoxyethoxyethyl (meth)acrylate, ethoxyethoxyethyl (meth)acrylate, ethoxytriethyleneglycol (meth)acrylate, polyethyleneglycol (meth)acrylate, polyethyleneglycolmethylether (meth)acrylate, ethoxylated nonylphenol (meth)acrylate, propoxylated nonylphenol (meth)acrylate, ethoxylated phenol (meth)acrylate, or polypropyleneglycol (meth)acrylate.

5. The seal tape according to claim 2, wherein the polymer includes 30 to 300 parts by weight of the monomer represented by Formula 1 with respect to 100 parts by weight of a (meth)acrylic acid ester monomer in a polymerized form.

6. The seal tape according to claim 2, wherein the crosslinkable monomer includes at least one crosslinkable functional group selected from a hydroxyl group, a carboxyl group, an epoxy group, a glycidyl group, an isocyanate group, an amide group, an amino group, or an alkoxysilyl group.

7. The seal tape according to claim 2, wherein the polymer includes 0.1 to 10 parts by weight of the crosslinkable monomer with respect to 100 parts by weight of the (meth)acrylic acid ester monomer in a polymerized form.

8. The seal tape according to claim 2, wherein the pressure-sensitive adhesive composition further includes a crosslinking agent.

9. The seal tape according to claim 8, wherein the crosslinking agent is included in an amount of 0.001 to 10 parts by weight with respect to 100 parts by weight of the total composition.

10. The seal tape according to claim 8, wherein the crosslinking agent includes at least one selected from an isocyanate-based compound, an epoxy-based compound, an aziridine-based compound, or a metal chelate-based compound.

11. The seal tape according to claim 1, wherein the base layer is at least one selected from an acryl film, a polyolefin film, a polyamide film, a polycarbonate film, a polyurethane film, a cellulose acetate film, or a polyester film.

12. The seal tape according to claim 11, wherein the polyester film is at least one selected from a polyethyleneterephthalate film, a polyethylenenaphthalate film, or a polybutyleneterephthalate film.

13. The seal tape according to claim 1, wherein the base layer has a thickness of 10 to 200 μm.

14. The seal tape according to claim 1, wherein the pressure-sensitive adhesive layer has a thickness of 2 to 100 μm.

15. The seal tape according to claim 1, wherein the pressure-sensitive adhesive layer has a peeling strength at room temperature of 370 gf/25 mm or less with respect to glass, which is measured at a peeling rate of 5 mm/sec and a peeling angle of 180 degrees.

16. A secondary battery, comprising:
    an electrode assembly including a positive electrode plate, a negative electrode plate, and a separation film interposed between the positive electrode plate and the negative electrode plate; and
    the seal tape of claim 1 adhered to a circumferential surface of the electrode assembly by means of a pressure-sensitive adhesive layer.

17. The secondary battery according to claim 16, wherein the seal tape is adhered to surround the circumferential surface including a closing part in which the outermost end of a separation film of the circumferential surface of the electrode assembly is located.

18. The secondary battery according to claim 16, wherein the pressure-sensitive adhesive layer has a peeling strength at room temperature of 1200 gf/25 mm or less with respect to a separation film, which is measured at a peeling rate of 5 mm/sec and a peeling angle of 180 degrees.

19. The secondary battery according to claim 16, which has a cylindrical shape.

* * * * *